United States Patent [19]

Enquist

[11] 4,077,149
[45] Mar. 7, 1978

[54] DEVICE FOR JIGGING A FISH BAIT ON A LINE

[75] Inventor: Andrew N. Enquist, Eldron, Wis.

[73] Assignee: Walter I. Johnson, Superior, Wis.

[21] Appl. No.: 736,376

[22] Filed: Oct. 28, 1976

[51] Int. Cl.² .............................................. A01K 87/00
[52] U.S. Cl. ..................................................... 43/19.2
[58] Field of Search .............................. 43/19.2, 26.1

[56] References Cited

U.S. PATENT DOCUMENTS

| 2,643,478 | 6/1953 | Paulsen | 43/19.2 |
| 2,976,640 | 3/1961 | Sensenbrenner | 43/19.2 |
| 3,031,790 | 5/1962 | Duryea | 43/19.2 |
| 3,568,352 | 3/1971 | Hill | 43/19.2 X |
| 3,599,369 | 8/1971 | Carlson | 43/19.2 X |

Primary Examiner—Russell R. Kinsey
Assistant Examiner—Daniel J. Leach
Attorney, Agent, or Firm—Wicks & Nemer

[57] ABSTRACT

A device for jigging a fish bait on a line including a base having a standard mounted thereon. Mounted on the standard is a flexible wand including a flexible primary wand portion fixedly secured at its lower end to the standard and at its upper end to a plate and a secondary flexible wand portion secured at the upper end to said plate and slidably adjustable at its lower end upon the lower end of the primary wand so that sliding movement of the secondary wand portion upon the fixed primary wand portion causes the primary wand to assume a position from vertical to any arced position between vertical and substantially at 90° position depending upon the wind currents and the speed of "jigging" desired. Mounted on the standard is a reel having a supply of fish line, the line extended from the reel to the outer end of the wand on which is mounted stop members which grippingly and releasably engages the line. As wind currents hit the plate the wand moves up and down and the line with a bait thereon moves up and down. The line releases from the wand when a fish grabs the bait. Movement of a live minnow on the line creates a greater movement of the wand action.

4 Claims, 7 Drawing Figures

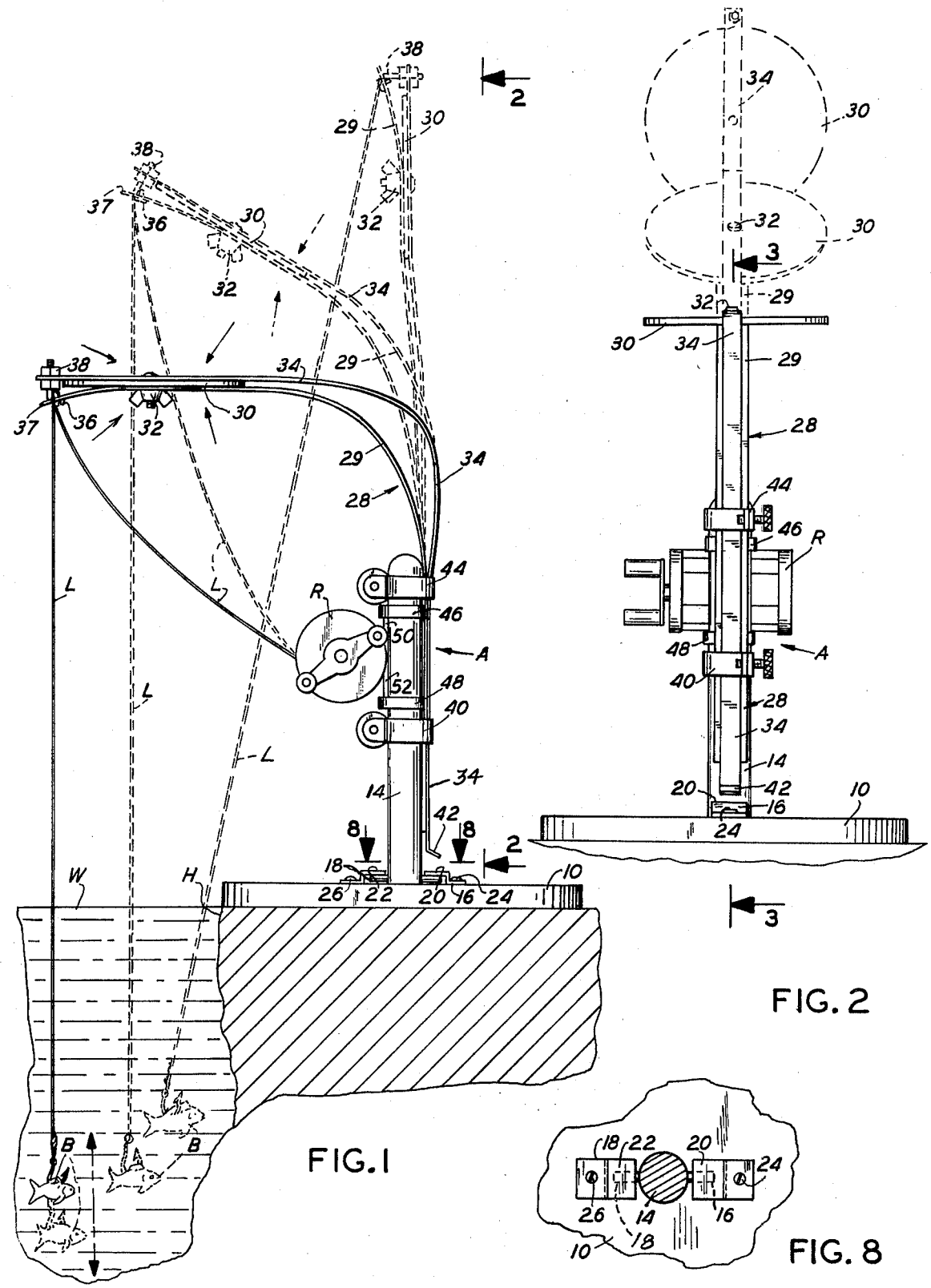

DEVICE FOR JIGGING A FISH BAIT ON A LINE

SUMMARY

The invention relates to an improvement in a device for "jigging" a fish bait on the end of a fish line. In the catching of fish with fish line and bait it has been found desirable to cause the bait to move to attract fish. It is therefore an object of the invention to provide a device which causes a line with bait thereon to automatically move up and down due to the effect of wind currents upon the device. The device is also caused to move up and down to a greater degree with the swimming action of a live minnow on the line. With an artificial lure on the line the same "jigging" action is accomplished by means of wind currents upon the wand plate.

It is a further object of the invention to provide a device for "jigging" fish bait on a line which includes a flexible primary wand portion secured to the standard with a flexible secondary wand portion. The outer end of each of the wand portions are connected to a rigid flag member. The lower end of the secondary wand portion is adjustably slidable on and frictionally engaged with the lower end of the primary wand portion so that the primary wand portion is arced into selectable arced positions by sliding the secondary wand portion upwardly upon the primary wand portion.

The standard mounts a reel with a supply of fish line which is releasably secured between a pair of stops on the outer ends of the wands. A very slight current of air causes the flag member to move up and down due to the flexibility and arc positions of the wand portions thereby causing the line and the bait thereon to move up and down commonly referred to as "jigging". The position of the flag member may be adjusted to take full advantage of strong or light wind currents or for more or less "jigging" action depending upon the speed of "jigging" action desired. The greatest amount of "jigging" action is accomplished with the wand in full arced position. From the 90° position of plate of the wand to the vertical position the wand is progressively less flexible with less "jigging" movement possible. Thus, with the adjustable wand it also allows taking advantage of various wind currents for variable "jigging" action as desired by the fisherman. The device is so versatile that it can be adjusted to the desired "jigging" action whether slow or fast. The device may also be positioned at any point of the compass to wind direction to further control the amount of "jigging".

The invention will appear more clearly from the following detailed description when taken in connection with the accompanying drawings, showing by way of example a preferred embodiment of the inventive idea wherein like numerals refer to like parts throughout.

In the drawings forming part of this application:

FIG. 1 is a side elevational view of a device for jigging a fish bait on a line embodying the invention with the device shown in full extended arced position in full lines and in full up and intermediate operative positions in broken lines.

FIG. 2 is a front view of that shown in FIG. 1 on the line 2—2 thereof.

Figure 3:
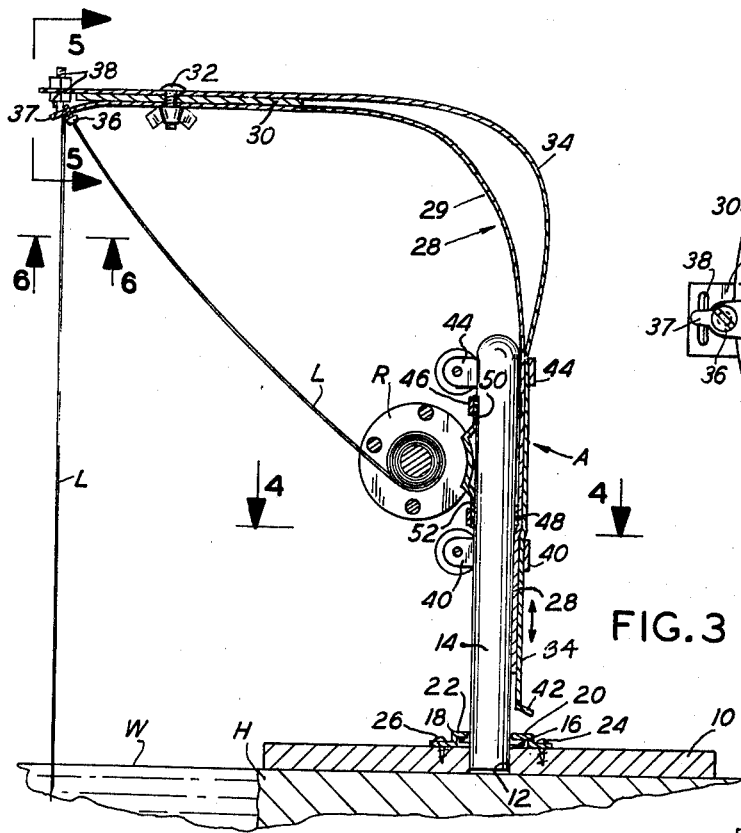
Figure 5:
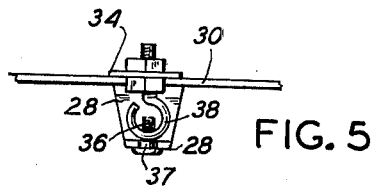
Figure 6:
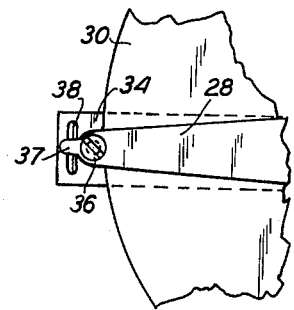
Figure 4:
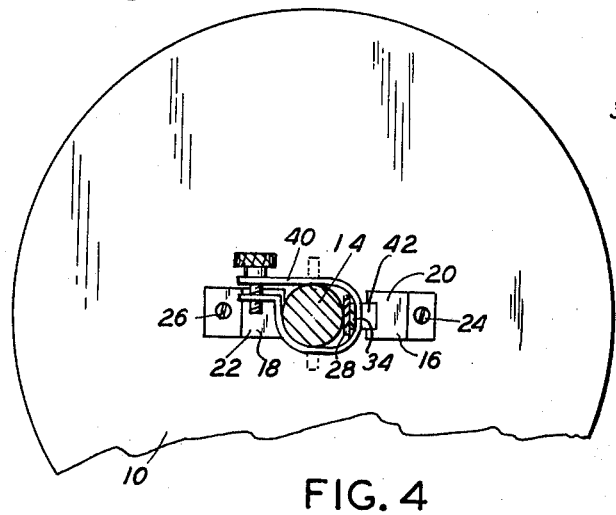
Figure 7:
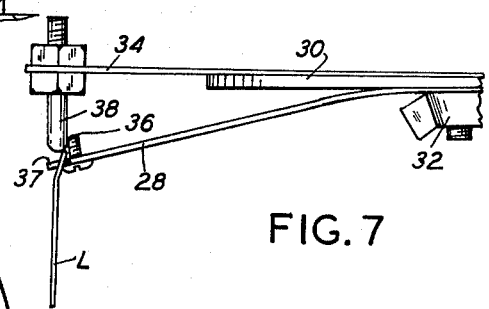

FIG. 3 is a sectional view on the line 3—3 of FIG. 2.
FIG. 4 is a sectional view on the line 4—4 of FIG. 3.
FIG. 5 is a view on the line 5—5 of FIG. 3.
FIG. 6 is a view on the line 6—6 of FIG. 3.
FIG. 7 is a detailed enlarged view of the upper end of the device.
FIG. 8 is a view on the line 8—8 of FIG. 1.

Referring to the drawings in detail, the device for jigging fist bait B includes the base 10 formed with the central hole 12. Further provided is the standard 14 the lower end of which is received in the central hole 12. Secured to and spaced from the lower end of the standard are the opposed ears 16 and 18 extending therefrom which releasably engage under the spaced tabs 20 and 22 mounted on the base. The tabs are spaced from the surface of the base 10 and are secured to the base by the screws 24 and 26 whereby the standard is removably mounted on the base. The removability of the base allows for easy carrying and storage.

The numeral 28 designates a flexible wand including a flexible primary portion 29 constructed of a relatively flat thin elongated piece of spring steel which is secured at its lower end to standard 14 with the wand portion connected to and extended upwardly from the standard and in line therewith. The upper end of the wand portion 29 is connected to the wind current sensitive rigid flag or plate 30 and secured to the flag 30 by means of the nut-equipped bolt 32. Further provided is the secondary flexible wand portion 34 made of a relatively flat thin elongated piece of spring steel secured adjacent its upper end to the plate 30 also by the bolt 32 with the wand portion 34 substantially upon and in line with the primary wand portion 29.

Mounted on the outer free end of the primary flexible wand portion 29 is the pin stop 36 with a small tab portion 37 of the wand 28 extending beyond the stop 36, and mounted on the outer free end of the secondary flexible wand portion 34 is the stop 38 in the form of an eyebolt secured by a nut. The stops 36 and 38 are so located on the ends of the respective wands which are urged together that the same lie adjacent and contact each other in a form of pinching relationship, particularly FIG. 7. The numeral 40 designates a lower adjustable conventional clamp which is secured to the standard 14 with the flexible wands 29 and 34 within the clamp and the wand 34 slidable upon the wand 29 and within the clamp by using the convenient tab 42 formed on the lower end of the secondary flexible wand 34.

Further provided is the upper adjustable conventional clamp 44 secured to the standard 14 in spaced relation to clamp 40 with the flexible wands 29 and 34 within the clamp and the wand 34 slidable upon the wand 29 and within the clamp 44. The clamps 40 and 44 are adjusted whereby the retarded sliding frictional movement of the flexible wand 34 upon the fixed flexible wand 29 is controlled so that the wand 34 remains in any given arced position on wand 29 from substantially that in broken lines in the fully down position to the fully upright position shown in broken lines in FIG. 1.

The numerals 46 and 48 designate a pair of conventional spaced rings mounted on the standard 14 under which the legs 50 and 52 of the conventional fishing line reel R are removably positioned to thereby mount the reel on the standard. Mounted on the reel R is the supply of fish line L.

OPERATION

In using the device A the line L is paid out from the reel R and placed on the tab 37 of flexible wand portion 29 and pinched between stop 38 and stop 36 whereby the line is releasably held upon the tab 37 of flexible wand portion 29. Flexible wand portion 29 is forced into the desired arc position by pushing upwardly upon tab 42 of wand portion 34 from the upright broken line position of FIG. 1 to the full line position thereof. In such a position the outer end of the wand 29 is extended beyond the base. The wand portion 29 may be placed in an arced position in any position between the full vertical position to one of 90° thereto depending upon the speed of jigging desired. With the wand and plate in full line position of FIG. 1. the wand is at its greatest flexibility and the degree of flexibility progressibely lessens as the wand is arced towards full upright vertical position. It will be seen that the flag may be adjustably positioned between the full upright position and the substantially horizontally position to accommodate wind currents and speed of jigging action desired. The flag is subject to wind currents from any and all directions illustrated by arrows in FIG. 1.

Bait B is then secured to the end of the line L and dropped into the water W in the ice hole H. Any draft of wind however slight affects the plate 30 and causes it to move and as a result the wand end moves up and down thereby moving the line and the bait thereon up and down in what is referred to as "jigging".

When a fish grabs the bait and pulls on the line L it easily releases from the between the pins 36 and 38 on the wands and thus becomes free from the device. The fish may then be pulled from the water on the line L. It will be seen that the device may be placed and used beside a hole in the ice or secured by conventional means to a portion of a boat with the line L extended into the water.

Having thus described the invention, what is claimed as new and desired to be secured by Letters Patent is:

1. A device for jigging a fish bait on a line comprising
   (a) a base,
   (b) a flexible wand,
   (c) means mounting said wand at one end on said base in substantially a vertical position,
   (d) a rigid flag member mounted on the other end of said wand,
   (e) means for causing said flexible wand to assume an arc position from substantially vertical to a position with said flag horizontal, the action of wind currents upon the flag causing the wand to flex to and fro from any position of the flag, and
   (f) means for releasably attaching a fish line with a bait thereon to the outer end of the wand, the line and bait moving up and down in a "jigging" action due to the action of wind currents upon the flag.

2. The device of claim 1 in which said means mounting said wand at one end on said base includes a standard connected to the base and on which the wand is connected.

3. The device of claim 2 in which said means for causing said wand to assume an arc includes
   (a) said flexible wand including a secondary flexible wand portion connected at the outer end to the outer end of
   (b) a primary flexible wand portion and said flag member, and
   (c) means frictionally and adjustably engaging the lower portion of said secondary wand upon said primary wand member.

4. The device of claim 1 in which said means for causing said wand to assume an arc includes
   (a) said flexible wand including a secondary flexible wand portion connected at the outer end to the outer end of
   (b) a primary flexible wand portion and said flag member, and
   (c) means frictionally and adjustably engaging the lower portion of said secondary wand upon said primary wand member.

* * * * *